(12) United States Patent
Tchoumou et al.

(10) Patent No.: US 10,585,574 B2
(45) Date of Patent: Mar. 10, 2020

(54) METHOD FOR ASSISTING THE MANIPULATION OF AT LEAST N GRAPHICAL IMAGE PROCESSING VARIABLES

(71) Applicant: LAOVILAND EXPERIENCE, Juvignac (FR)

(72) Inventors: Jean-Thierry Tchoumou, Juvignac (FR); Pascal Tchoumou, Juvignac (FR); Matthias Rodriguez-Torrecillas, Perols (FR); Boris Jaulmes, Beziers (FR)

(73) Assignee: LAOVILAND EXPERIENCE, Juvignac (FR)

( * ) Notice: Subject to any disclaimer, the term of this patent is extended or adjusted under 35 U.S.C. 154(b) by 0 days.

(21) Appl. No.: 16/068,116

(22) PCT Filed: Dec. 30, 2016

(86) PCT No.: PCT/FR2016/000218
§ 371 (c)(1),
(2) Date: Jul. 4, 2018

(87) PCT Pub. No.: WO2017/118783
PCT Pub. Date: Jul. 13, 2017

(65) Prior Publication Data
US 2019/0012068 A1 Jan. 10, 2019

(30) Foreign Application Priority Data

Jan. 4, 2016 (FR) ...................................... 16 50006

(51) Int. Cl.
*G06F 3/01* (2006.01)
*G06F 3/0484* (2013.01)
(Continued)

(52) U.S. Cl.
CPC .......... *G06F 3/04845* (2013.01); *G06F 3/011* (2013.01); *G06F 3/0486* (2013.01);
(Continued)

(58) Field of Classification Search
CPC .. G06F 3/011; G06F 3/04845; G06F 3/04847; G06F 3/0486; G06F 11/3457; G06F 11/3466; G06F 17/24; G06T 7/90
(Continued)

(56) References Cited

U.S. PATENT DOCUMENTS

| | | | |
|---|---|---|---|
| 8,089,551 B2 * | 1/2012 | Uehara | H04N 1/00413 348/222.1 |
| 2004/0027397 A1 * | 2/2004 | Sato | G06F 3/0421 715/863 |
| 2009/0094053 A1 * | 4/2009 | Jung | G06Q 10/00 705/2 |
| 2010/0247825 A1 * | 9/2010 | Wood | C08L 23/04 428/35.7 |

(Continued)

*Primary Examiner* — Jin Cheng Wang
(74) *Attorney, Agent, or Firm* — Craft Chu PLLC; Andrew W. Chu

(57) ABSTRACT

A method for assisting the manipulation of at least n graphical image processing variables by a user is provided with a control organ having a plurality of modes of activation, based on a control polygon appearing on a screen portion provided with a marker. At least each vertex of the control polygon represents a processing variable, each vertex being movable between two limit points defining a direction of action by at least one mode of activation of the control organ. A movement in this direction means a modification of the value of the variable, which is proportional to the amplitude of the movement.

8 Claims, 2 Drawing Sheets

(51) Int. Cl.
*G06F 3/0486* (2013.01)
*G06T 7/90* (2017.01)
*H04N 1/00* (2006.01)
*G06F 11/34* (2006.01)

(52) U.S. Cl.
CPC ...... *G06F 3/04847* (2013.01); *G06F 11/3457* (2013.01); *G06F 11/3466* (2013.01); *G06T 7/90* (2017.01); *H04N 1/00* (2013.01)

(58) Field of Classification Search
USPC ........................................ 345/619, 440, 441
See application file for complete search history.

(56) References Cited

U.S. PATENT DOCUMENTS

| | | | |
|---|---|---|---|
| 2011/0106865 A1* | 5/2011 | Boss | G06F 17/24 708/200 |
| 2011/0182511 A1 | 7/2011 | Chien | |
| 2014/0074260 A1* | 3/2014 | Schroeder | G05B 19/41865 700/73 |
| 2014/0210831 A1* | 7/2014 | Stenger | G06T 13/40 345/474 |
| 2015/0112615 A1* | 4/2015 | Jeong | G06F 11/34 702/60 |
| 2015/0287150 A1* | 10/2015 | Meerdo | G06Q 50/08 705/7.23 |
| 2016/0029943 A1* | 2/2016 | Mizuochi | A61B 5/222 702/141 |
| 2017/0026083 A1 | 1/2017 | Sejpal et al. | |

* cited by examiner ic image processing. The aim is to assist the manipulation of several processing variables so that a user can modify at will certain characteristics of the data on which he works, using usual control organs. These control means generally include a limited number of modes of activation and the direct interventions initiated from these modes are not sufficient to provide the user with a sufficiently ambitious range of checking and control means for an optimal seamless use.

METHOD FOR ASSISTING THE MANIPULATION OF AT LEAST N GRAPHICAL IMAGE PROCESSING VARIABLES

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a method for assisting the setting and control of the parameters used in automated graphic image processing. The aim is to assist the manipulation of several processing variables so that a user can modify at will certain characteristics of the data on which he works, using usual control organs. These control means generally include a limited number of modes of activation and the direct interventions initiated from these modes are not sufficient to provide the user with a sufficiently ambitious range of checking and control means for an optimal seamless use.

2. Description of Related Art Including Information Disclosed Under 37 CFR 1.97 and 37 CFR 1.98

The context of use may be that of automated graphic processing methods permitting for example to guide creators, while being a source of inspiration, of visual representations obtained by means of a computer. In the cases being contemplated, graphic material is extracted from existing images, in various and editable forms through various automated processes, this material being re-workable by the computer system based on parameters and controls supplied and adjusted in real time by the user. These possibilities of intervention by the user on system variables are controlled in particular through a graphical interface, which is the object matter of the invention.

The graphic material being used is taken from source image files stored in the memory of the electronic processing system. Technical processing operations applied to the source image then permit to transform it stepwise, the user maintaining the possibility of changing the nature and the amplitude of the processing operations, namely through said graphic interface of the invention.

In order for the interventions by the user to be able to have a flexibility and a potential that permit him to deploy his creativity, to be able to act as he wishes on the image and namely to have levers for transforming the latter that are sufficiently ambitious, it is necessary for him be able to work on several parameters almost simultaneously, ideally in an as large number as possible.

BRIEF SUMMARY OF THE INVENTION

This is the aim of the method of the present invention, which permits to assist the manipulation of at least n graphic image processing variables by a user provided with a control organ having several modes of activation. The method is based on the existence of a control polygon appearing on a screen portion provided with a marker. At least each vertex of this polygon represents a processing variable, each of said vertices being movable between two limit points defining a direction of action by means of at least one mode of activation of the control organ. A movement in this direction means, according to the method, a modification of the value of the variable, which is proportional to the amplitude of the movement.

According to the invention, the method is such that it includes the following steps:
  detecting at a time t a first mode of activation of the control organ at a location of the cursor on or near a vertex of the polygon;
  identifying the coordinates and storing the initial point corresponding to the detected location;
  in the absence of stopping the activation of the control organ according to said first mode, detecting a movement in a constantly activated position of the control organ;
  detecting the stopping of the activation of the control organ and storing the coordinates of the destination point;
  calculating the traveled distance;
  determining the orientation of the traveled path, and projecting on the direction of action;
  modifying the variable corresponding to the vertex on or in the vicinity of which the cursor has been activated, depending on the length of the projection on the direction of action of the traveled distance.

According to a preferred example, which will be used in the continuation of the text to fix the ideas, but is in no way restrictive for the invention, the mentioned graphic processing includes saliency processing operations performed based on criteria that permit to characterize the visual identity of the image. These are in fact optical parameters such as, for example, the intensity, the orientations, the colors, the saturation, etc., of the image. These saliency methods aim at extracting the salient points of an image according to these different criteria, by identifying and isolating in essence the areas that would naturally draw the attention of a human eye.

According to a possible configuration, in the meaning of the invention, the limit points may belong to two fixed polygons, respectively an outer one and an inner one, with n sides having the same center as the control polygon, surrounding the control polygon and the vertices of which are aligned with those of the control polygon.

The graphical interface is thus characterized by these concentric polygons, which the user is very naturally incited to manipulate, and which provide him with an immediate global view of the system settings. According to a possible initial configuration, which is however in no way restrictive, the vertices of the control polygon are placed, when initializing the method, halfway between those of the two fixed polygons. A mean value of the processing parameters is thus fixed when a new graphic work is started, conferring to the graphic material before transformation a "neutral" aspect, which is easily changeable in both directions.

By convention, according to the invention, each vertex of the outer fixed polygon corresponds to a modulation coefficient of the variable controlled by the vertex of the control polygon, which is aligned with same, having a value 1, while each vertex of the inner fixed polygon corresponds to a modulation coefficient having a value 0.

Dragging the vertex of the control polygon between these two limits permits to assign from 0% to 100% of the value of the controlled criterion, for example saliency.

The graphical interface permits other settings. Thus, the detection of a second mode of activation of the control organ corresponding to a location of the cursor in an active field located in the vicinity of a direction of action of the control polygon leads to an inversion of the processing of the variable corresponding to this vertex, said active field changing in addition the background color at each detection of said second mode of activation of the control organ.

It is thus possible to multiply by two the number of possible settings of the controlled variable, by simple inversion of the processing, the interface making this operation both obvious and simple to be performed within the framework of the method of the invention.

In practice, and preferably, each active field is limited by the two fixed polygons and straight lines joining the centers of the sides of said polygons surrounding a control direction. This is thus a control field that profits from a surface that is not negligible, facilitating even more its manipulating.

According to another specificity of the invention, the polygons are centered in a control screen including a horizontal line movable by translation between the bottom and the top of the screen and adjusting the value of a variable n+1 independent from the abovementioned n variables, and the position of which on the screen is adjustable through activation of the control organ outside the polygons, for example according to the first mode of activation.

The control of a new variable, the quantification of which by the user also occurs immediately, in fact at one glance, is another advantage of the method that is designed to provide its users with a maximum user-friendliness together with a very intuitive, efficient and immediate use.

According to another possibility inherent in the method, the detection of a third mode of activation of the control organ on said control screen, in which the polygons are centered, leads to changing the state of the display of values materializing the value given to the variable by moving in the direction of activation, between a state of display near the vertices of the outer polygon and a state of non-display.

This option provides an additional degree of information to users, who can benefit from an accurate display of the value of the controlled parameter setting slider.

Reported has been the control organ that is used by the user to make adjustments, which are of course largely facilitated by the existence of the graphical interface, which makes them easy and provides in addition a feedback by maintaining displayed the parameter changes being made.

Preferably, this control organ is not specific to the invention, but takes advantage of the technical capabilities of an existing and generalized peripheral device: according to the invention, the control organ may be a mouse with a central button and right and left controls. In that case, the first mode of activation may consist of a left click, the second mode of activation of a right click and the third mode of activation may be a click with the central button of the mouse, sometimes identified by a scroll wheel. This is also a nonrestrictive configuration of the invention, which may optionally be without such an external mouse-type organ, due to the possibilities provided for example by the touch screen technologies.

As has been mentioned, the invention also relates to an application of a method for assisting the manipulation of n graphic image processing variables as described above for performing a graphic processing including n (n≥1) visual saliency processing operations on a selected source image file, namely followed by a thresholding creating saliency spots, based on n predetermined saliency criteria controlled by the n vertices of a control polygon. Each of said criteria can furthermore be inverted by control in an active field located around the vertex corresponding to the criterion to be inverted. A thresholding threshold can finally be controlled by moving a horizontal line on a screen containing the control polygon.

The access to the control of all these parameters is made extremely simple by the method of the invention, which combines ease of use and user-friendliness, processing in real time the requests from the user by providing in addition a visual acknowledgment. The graphic interface, which is at the core of the invention, permits everyone to be informed at any time of the state of the system, as regards the values selected for the different adjustment parameters.

BRIEF DESCRIPTION OF THE SEVERAL VIEWS OF THE DRAWINGS

The invention will now be described in more detail with reference to the attached figures, which represent non-restrictive examples of implementation of the invention.

DETAILED DESCRIPTION OF THE INVENTION

Figure 1:
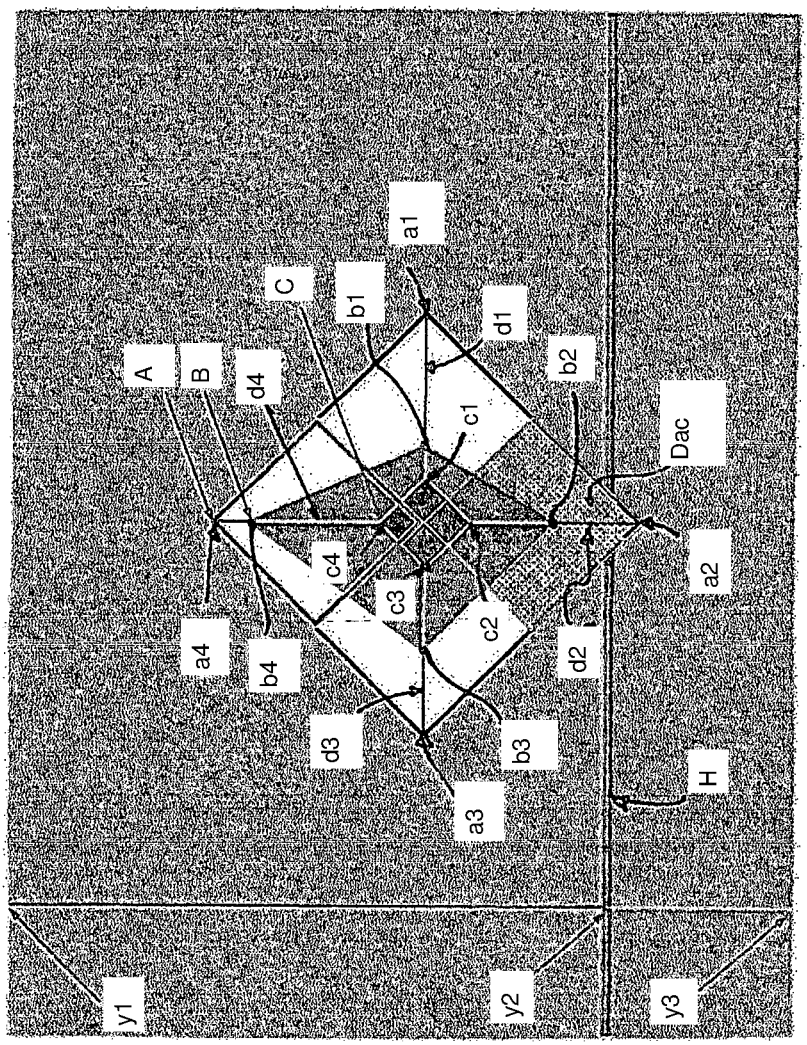
FIG. 1 shows a schematic view of an example of a graphical interface based on concentric polygons and from which the invention is implemented.

With reference to FIG. 1, the two fixed outer (A) and inner (C) polygons surround a control polygon (B), the four vertices (b1, b2, b3, b4) of which are movable by drag-and-drop by actuating for example the left click of a mouse and holding it pressed until the end of the movement. The inner polygon (C) is a "dead" zone, which is not sensitive to any action by the control organ. The vertex (b1, b2, b3, b4) onto which the action is exerted is moved to a final position, which reflects a change in intensity of the processing variable, which it corresponds to. In the non-restrictive example of the salience processing operations, for example in which a source image constituting a graphic material is subjected to several parallel visual saliency processing operations based on different saliency criteria, each of them corresponds to one of the vertices (b1, b2, b3, b4). The criteria of salience retained may for example be the intensity, the orientations, the colors, and the saturation of the image, which each "occupy" one of the vertices (b1, b2, b3, b4). The position of each of the vertices (b1, b2, b3, b4) on the segments materializing the directions of action (d1, d2, d3, d4) limited by the vertices (a1, a2, a3, a4) of the fixed outer polygon (A) and (c1, c2, c3, c4) of the fixed inner polygon (C), respectively, reflects the weighting given to the corresponding criterion.

The position taken corresponds in fact to a weighting factor between 0 and 1. The value 1 implies that the vertices (b1, b2, b3, b4) of the control polygon (B) are identified at the vertices (a1, a2, a3, a4) of the outer fixed polygon (A). The value 0 implies that the vertices (b1, b2, b3, b4) of the control polygon (B) are directly placed on the vertices (c1, c2, c3, c4) of the inner fixed polygon (C).

In the example shown in FIG. 1, the variable criterion in the direction of action (d4) is weighted by a factor of about 0.8 (see the position of the vertex (b4) in FIG. 1, while the one that varies in the direction (d1) is at a height of about 0.25, as shown by the position of the vertex (b1). The two remaining criteria have not been modulated, and their corresponding vertices (d2, d3) thus remain in the initial "resting" position at 0.5, when such an initialization position is used.

It should be noted that all these criteria of saliency can be inverted by an action in an active field (Dac) such as the one that is shown hatched in FIG. 1. For the sake of clarity, only one of the active fields is represented, but they exist for the four directions of action. A change in color of the background of these fields confirms any change of state obtained for example by a right click in a field.

In the example of a graphic processing, for which the method of the invention could be applied, a thresholding operation can be performed after the saliency processing operations, which implies the definition of a threshold. This threshold is controllable, according to the method of the invention, by an action on a horizontal line H. The result of the thresholding is a binarization of the image, giving rise to areas with only two hues, black and white, as can be seen for example in FIG. 2. The white spots correspond in practice to the areas that are above the first threshold, and are filled with white after the "filtering" processing said thresholding represents. This threshold is variable, the variation of this parameter being achieved by manipulation of the mouse, for example by drag-and-drop after a left mouse click on the line H, and outside the polygons (A, B, C). In FIG. 1, the threshold is about 20%. The black spots correspond to the portions that are below said threshold, and in practice form the background of the thresholded image.

Figure 2:
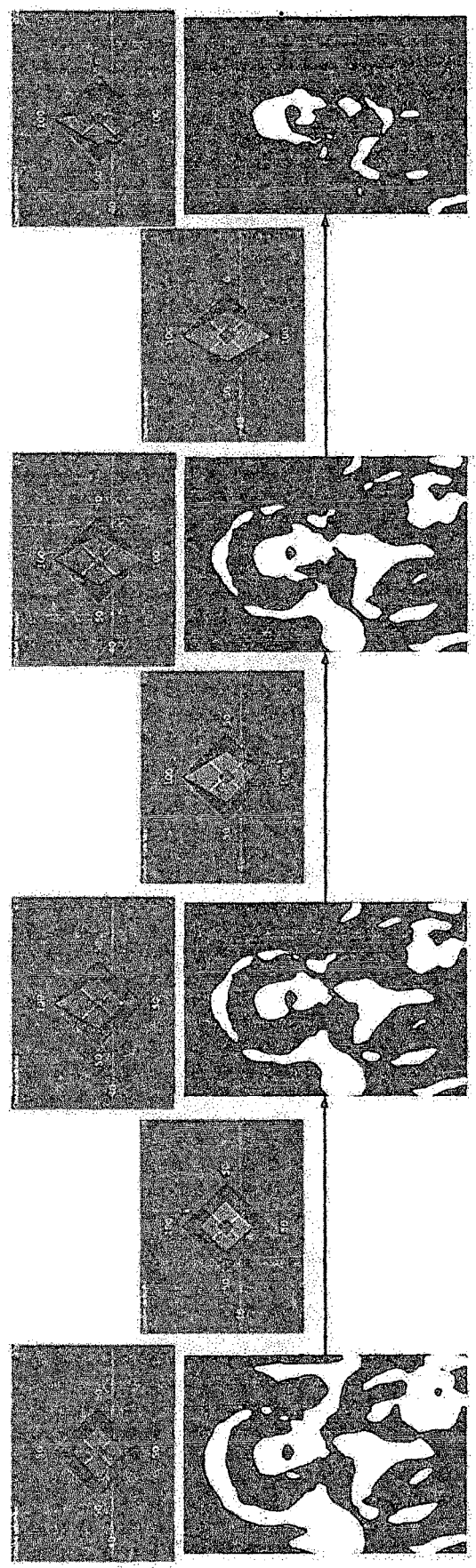
FIG. 2 shows a schematic view representing an example of successive processing operations applied to an image by means of the method of the invention.

In FIG. 2, the threshold chosen is 40%, which value can be seen in the figure like the weighting values of the various criteria that can be controlled through the control polygon (B). This figure also shows, in addition to the manipulation and control screen according to the method of the invention, the resulting image, placed under said screen, for four different settings. Between these screen/image pairs, above the horizontal arrows, intermediate screens are shown during an adjustment. The screens in FIG. 2 also show the four active fields (Dac) surrounding the directions of action and materialized by at least partially white lines cutting four areas of the same surface in the polygons (because in this case they are squares).

Looking from left to right, the first image reflects the setting appearing in the screen above it: the 4 criteria are weighted up to 50%, and the threshold is set at 40%. This threshold is in fact not modified in the screens of FIG. 2. When moving to the next image towards the right of FIG. 2, the screen during the adjustment shows that the coefficient of the upper quadrant, in the direction of action (d4), of FIG. 1 is modified. In other words, the vertex (b4) (see FIG. 1) is moved and positioned on the vertex (a4) of the outer polygon (A): the coefficient is at 100%, which means that, in practice, there no longer exists any weighting. The spots in the figure below slightly decrease in comparison with the first image under consideration.

The second operation is symmetrical to the first one, but in the lower quadrant, in the direction of action (d2). The vertex (b2) of the control polygon (B) is placed on the vertex (a2), for a "weighting" of the criterion corresponding to 100%. The spots in the figure below are also modified, in the meaning of a slight increase of the white surfaces.

During the next transition, the criterion corresponding to the direction of action (d1) is set to 0, which means that the vertex (b1) of the control polygon (B) is placed on the vertex (c1) of the inner fixed polygon (C). The graphical result shown in the figure below, which shows a noticeable decrease of the spots, for a yet different visual rendering.

In the example used in FIG. 2, the direction of action (d1) corresponds for example to an orientation coefficient, the direction (d2) reflects a saturation coefficient, the direction (d3) reflects the variation of a color coefficient and the last direction (d4) corresponds to an intensity coefficient.

It should be noted that the particular shape of the graphical interface used within the framework of the method of the invention permits to make the displayed data retrievable by graphic detection, in the way of a QR code, in practice by simply detecting key points.

Thus, the value given to each coefficient of the control polygon (B) is reflected by the positions of the vertices (b1, b2, b3, b4). These values can be calculated graphically, since the weighting coefficient is in any case equal to the ratio of the bncn/ancn segments, which can easily be calculated by optical detection.

Likewise, the value of the threshold can easily be calculated by optical detection means, since it corresponds to calculating a value equal to the Y3Y2/Y3Y1 ratio. It is therefore sufficient to have the three points Y3, Y2 and Y1 shown in FIG. 1, and which can very easily be detected by conventional optical means. In other words, an optical detection method can permit to automatically extract the adjustment parameters being used, which appear in fact in the graphical interface.

The invention is of course not limited to the examples described and explained with reference to the figures, but encompasses the variants and versions that fall within the scope of the claims.

We claim:

1. A method for assisting manipulation of at least n graphic image processing variables by a user, the method comprising the following steps:
   connecting a control organ having a first mode of activation and a second mode of activation to a screen with a cursor, said screen having a screen portion displaying a control polygon having a plurality of vertices,
   wherein at least one vertex represents a processing variable,
   wherein each vertex is movable between two limit points defining a direction of action, according to a respective mode of activation of said control organ,
   wherein a movement in said direction of action corresponds to a modification of a value of a respective processing variable, said modification being proportional to an amplitude of said movement;
   placing said cursor on a first vertex of said control polygon;
   activating said first mode of activation so as to detect a first time and a first detected location;

identifying initial coordinates as an initial point of said first detected location and storing said initial point;

moving said control organ and maintaining the step of activating said first mode of activation so as to detect a constantly activated movement said control organ;

placing said cursor at a destination location and stopping the step of activating said first mode of activation so as to identify destination coordinates as a destination point;

calculating a traveled distance according to said detected location and said destination location so as to determine a traveled path;

determining orientation of said traveled path, and projecting said direction of action for said respective mode of activation;

modifying said processing variable corresponding to said first vertex, depending on length of said direction of action corresponding to said traveled distance;

placing said cursor in an active field of a selected vertex of said control polygon, said active field being along a corresponding direction of action of said selected vertex;

activating said second mode of activation with said cursor in said active field;

inverting the step of modifying a corresponding processing variable of said selected vertex of said control polygon for said first mode of activation; and changing a background color of said active field.

2. The method for assisting the manipulation of n graphic image processing variables according to claim 1, wherein said screen displays an outer polygon having a plurality of outer vertices and an inner polygon having a plurality of inner vertices, wherein each outer vertex corresponds to a respective vertex of said control polygon, wherein each inner vertex corresponds to said respective vertex of said control polygon, wherein each outer vertex corresponds to a respective inner vertex so as form each pair of vertices, wherein each two limit points of a respective each vertex of said control polygon correspond to a respective each pair of vertices.

3. The method for assisting the manipulation of n graphic image processing variables according to claim 2, wherein a respective each vertex of said control polygon is placed halfway between a corresponding outer vertex and a corresponding inner vertex.

4. The method for assisting the manipulation of n graphic image processing variables according to claim 3, wherein each outer vertex corresponds to an outer modulation coefficient of said processing variable of a corresponding vertex of said control polygon, wherein each inner vertex corresponds to an inner modulation coefficient of said processing variable of said corresponding vertex of said control polygon, wherein said outer modulation coefficient has a value 1, said inner modulation coefficient having a value 0.

5. The method for assisting the manipulation of n graphic image processing variables according to claim 2, wherein each active field of each direction of action is limited by said outer polygon, said inner polygon, and straight lines joining centers of sides of said outer polygon, said control polygon, and said inner polygon around said direction of action.

6. The method for assisting the manipulation of n graphic image processing variables according to claim 2, wherein said control organ has a third mode of activation, the method further comprising the steps of:

placing said cursor on said screen;

activating said third mode of activation with said cursor on said screen; and changing between a state of display of values corresponding to said processing variable adjacent each outer vertex of said outer polygon and a state of non-display.

7. The method for assisting the manipulation of n graphic image processing variables according to claim 1, wherein said control organ is comprised of a mouse with a central button, a right control button, and a left control button, said first mode of activation corresponding to clicking said left button, said second mode of activation corresponding to clicking said right button, and wherein said control organ has a third mode of activation, said third mode of activation corresponding to clicking said central button.

8. A method for assisting the manipulation of n graphic image processing variables by a user, the method comprising the following steps:

connecting a control organ having a first mode of activation and a second mode of activation to a screen portion with a cursor, said screen portion displaying a control polygon having a plurality of vertices, wherein at least one vertex represents a processing variable, wherein each vertex is movable between two limit points defining a direction of action, according to a respective mode of activation of said control organ, wherein a movement in said direction of action corresponds to a modification of a value of a respective processing variable, said modification being proportional to an amplitude of said movement;

placing said cursor on a first vertex of said control polygon;

activating said first mode of activation so as to detect a first time and a first detected location;

identifying initial coordinates as an initial point of said first detected location and storing said initial point;

moving said control organ and maintaining the step of activating said first mode of activation so as to detect a constantly activated movement said control organ;

placing said cursor at a destination location and stopping the step of activating said first mode of activation so as to identify destination coordinates as a destination point;

calculating a traveled distance according to said detected location and said destination location so as to determine a traveled path;

determining orientation of said traveled path, and projecting said direction of action for said respective mode of activation; and modifying said processing variable corresponding to said first vertex, depending on length of said direction of action corresponding to said traveled distance, wherein said screen displays an outer polygon having a plurality of outer vertices and an inner polygon having a plurality of inner vertices, wherein each outer vertex corresponds to a respective vertex of said control polygon, wherein each inner vertex corresponds to said respective vertex of said control polygon, wherein each outer vertex corresponds to a respective inner vertex so as form each pair of vertices, wherein each two limit points of a respective each vertex of said control polygon correspond to a respective each pair of vertices, wherein said outer polygon and said inner polygon are centered in said screen, and wherein said screen displays a horizontal line movable by translation between a bottom of said screen and a top of said screen, the method further comprising the steps of:

adjusting value of a variable n+1 independent from n variables of said control polygon by placing said cursor outside said outer polygon and activating any mode of activation.

* * * * *